(12) United States Patent
Boschma (10) Patent No.: US 8,354,758 B1
(45) Date of Patent: Jan. 15, 2013

(54) CYCLO-TURBINE POWER GENERATOR

(75) Inventor: James H. Boschma, Huntsville, AL (US)

(73) Assignee: Boschma Research, Inc., Brownsboro, AL (US)

( * ) Notice: Subject to any disclaimer, the term of this patent is extended or adjusted under 35 U.S.C. 154(b) by 0 days.

(21) Appl. No.: 13/306,856

(22) Filed: Nov. 29, 2011

Related U.S. Application Data (60) Provisional application No. 61/417,823, filed on Nov. 29, 2010.

(51) Int. Cl.
*F03B 13/00* (2006.01)
*H02P 9/04* (2006.01)

(52) U.S. Cl. .......................... 290/54; 290/43

(58) Field of Classification Search ............. 290/54, 290/43, 55
See application file for complete search history.

(56) References Cited

U.S. PATENT DOCUMENTS

| | | | |
|---|---|---|---|
| 38,383 A | 5/1863 | Gregory | |
| 2,896,545 A | 7/1959 | Brulle | |
| 4,383,797 A | 5/1983 | Lee | |
| 4,609,827 A | 9/1986 | Nepple | |
| 6,932,296 B2 | 8/2005 | Tierney | |
| 7,365,448 B2 * | 4/2008 | Stephens | 290/55 |
| 7,466,035 B1 * | 12/2008 | Srybnik et al. | 290/43 |
| 7,918,646 B2 * | 4/2011 | Akcasu | 416/1 |
| 8,072,091 B2 * | 12/2011 | Wilson et al. | 290/55 |
| 2007/0036641 A1 | 2/2007 | McNabb et al. | |
| 2012/0091727 A1* | 4/2012 | Tsitron | 290/55 |

OTHER PUBLICATIONS

I. S. Hwang et al, Optimization of Cycloidal Water Turbine and the Preformance Improvement by Individual Blade Control, Applied Energy 86, 1532-1540, Jan. 4, 2009, Rep. of Korea Qinetiq Ltd, Cycloidal Tidal Power Generation—Phase 1, T/06/00229/Rep/12004.
Cycloidal Tidal Power Generation-Phase 2 T/06/00229/00/REP/2 QinetiQ Ltd Aug. 2004.

* cited by examiner

*Primary Examiner* — Hae Moon Hyeon
(74) *Attorney, Agent, or Firm* — Mark Clodfelter (57) ABSTRACT

A Cycloidal Turbine Power Generator contained within a Venturi is disclosed. The Venturi is equipped with mechanisms to vary its inlet width to control flow volume through the Venturi, and to open and close the inlet as required. The Venturi is also equipped with inflatable turbulators installed upstream from the turbine, and which extend upward from the Venturi bottom to cause a downstream eddy to reduce drag on the advancing blades of the turbine. The turbine includes a plurality of airfoil-shaped blades mounted to vary their angle of attack during rotation of the turbine. The rotation of the blades about the common hub is caused by the action of the water flow over the blades. A ring gear may be fixed to the circumference of the blade disk for power generator interface.

20 Claims, 10 Drawing Sheets

CYCLO-TURBINE POWER GENERATOR

CROSS REFERENCE TO RELATED APPLICATIONS

This application claims the benefit of Applicant's U.S. provisional application No. 61/417,823, filed Nov. 29, 2010, which is incorporated herein by reference.

FIELD OF THE INVENTION

This invention relates to power generating turbines, and particularly to a water turbine that uses low velocity, shallow water flow, and in some embodiments is portable and easy to deploy and provide a temporary power source.

BACKGROUND OF THE INVENTION

Today, as many as 30% of the Earth's inhabitants live without access to electricity. Thus, there is a worldwide demand for reliable electric power generation. However, conventional electrification in many parts of the world is unaffordable by the local population, especially in regions where the population is distributed over significant distances without adequate means of transportation. Additionally, electricity generation is often a major source of pollution and damage to the environment. An example is the rapid industrialization of China, substantially through coal-burning power plants. The use of coal has resulted in China being the largest Greenhouse Gas emitter in the world, a record achieved in less than 50 years! The impact of the pollution is felt worldwide, but especially near the coal-burning power plants where it affects the health of both humans and animals. Chinese suffer from pollution related illnesses, damage to crops, fouled rivers and streams.

Applicant's River-In-Stream-Energy-Conversion (RISEC) Cyclo-Turbine Power Generator (CTPG) is novel and unique in that, when properly configured, can successfully operate in waters of unlimited depth, or in very shallow and slow-moving rivers. When the turbine is mounted so that its long axis is parallel to the water's surface, and perpendicular to the water's direction of flow, the CTPG can generate pollution-free electricity, even in water as shallow as one half of a meter (½ m) with a flow rate of 1-2 meters per second. This shallow water capability makes thousands of streams, rivers, and tidal sites useful for electric power generation and offers a new source of electricity to millions of people around the world. In addition, the CTPG operating in rivers, streams, canals, and tidal areas can produce energy levels adequate for many small communities and industrial plants with zero pollution. Conversely, CTPG systems operating in deep waters can deliver megawatt output and on a cost per watt basis that rivals conventional hydro electric plants.

The CTPG also overcomes a variety of environmental concerns, eliminating the need for new dams, river locks, fish ladders, and hydrocarbon power plant cooling ducts and cooling stacks. Additionally, it requires little or no infrastructure, is typically secured in place by simple rock anchors or augers and tensioned cables, or in some cases where the generators are light and portable, ropes, cables or the like are attached to 'deadman' anchors on the shoreline of a river or stream. To facilitate installation, the system can be suspended from floatation equipment anchored in the flowing medium. The turbine can be installed with blades mounted horizontal to the flowing water's surface, or vertical (90 degrees) to the surface.

The submerged system is typically invisible to the casual observer, and does not disrupt the aesthetic characteristics of a waterway. The system is essentially silent, thus avoiding complaints of acoustic disturbance and avoiding disruption to wildlife habitat and breeding in areas near the installation site.

The CTPG also incorporates an Active Debris Guard to reject debris to reduce debris retention on the guard, reducing the need for debris guard cleaning and increasing overall power production. Further, the debris guard precludes entry into the system inlet section by fish, mammals, and curious humans, thus reducing the potential for injury to these species.

The CTPG can bring power generation to places where no useful RISEC power could be generated before. Governments, the military, private enterprise, and individuals may avail themselves of this non-polluting power source.

The prior art includes U.S. Pat. No. 4,609,827, issued Sep. 2, 1986, to Richard E. Nepple, and gives a detailed description of the operation of a Cycloidal Turbine. However, Applicant's CTPG system provides new features not found in previous renditions. These new features include the use of advanced flow control, a variable geometry inlet, easier installation via buoyancy enhancers where heavy equipment is not available, enhanced debris guard, enhanced fish safety and reduced maintenance associated with reduced parts count.

DETAILED DESCRIPTION OF THE DRAWINGS

Figure 1:
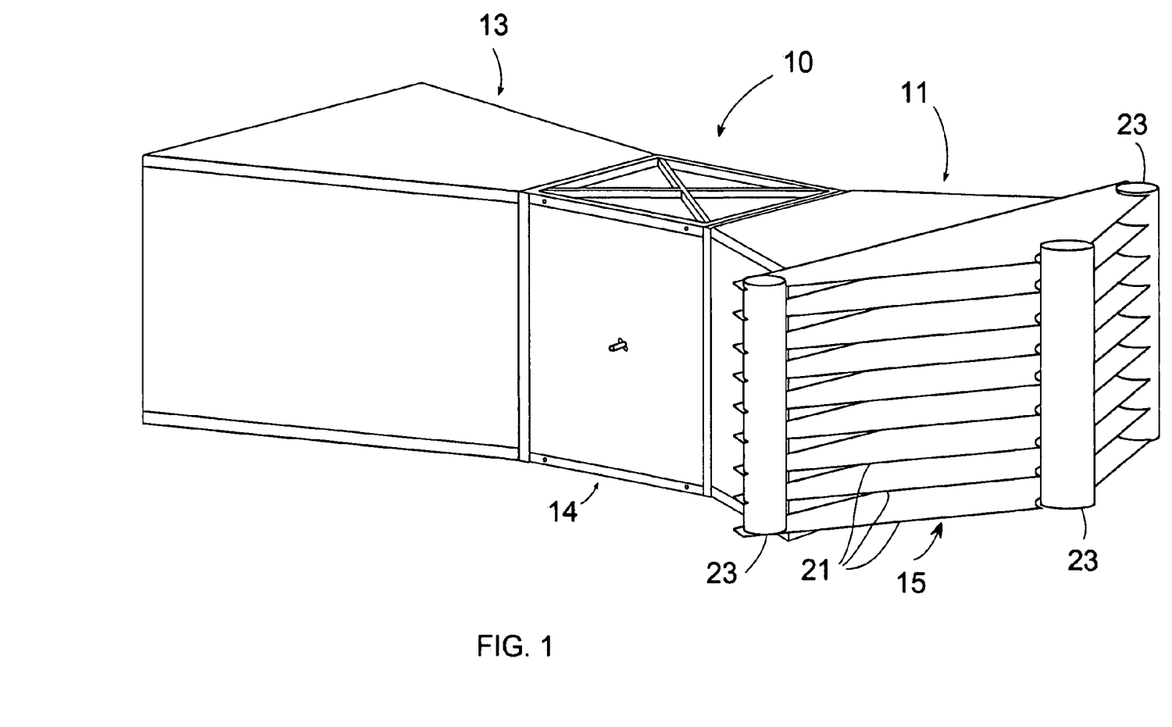
FIG. 1 is a pictorial view of a Cyclo-Turbine Power Generator of the present invention.

Referring to FIG. 1, the invention is a Cycloidal Turbine power generation unit 10 with an integrated variable inlet geometry Venturi flow accelerator 11, hereinafter designated simply as "inlet section 11". Unit 10 may be equipped with floatation augmentation bags (FIG. 8) for mobility, and with strategically-located inflatable turbulence inducing devices, hereinafter designated as turbulators, in the upstream flow to reduce drag on advancing blades, as will be further explained. Outlet diffuser section 13 is typically twice as long as the inlet, and extends at half the angle to slow the flow of water exiting from the apparatus to the same velocity as water entering the apparatus. The resulting apparatus is a high efficiency Cycloidal Turbine (Curtateor Pi-pitch blade motion may be integrated into the turbine) operating inside a multiple function Venturi housing, with integrated local inflated flow turbulators, and in some embodiments, flow straighteners, buoyancy control for installation, recovery or maintenance. This is the first application of a free standing, variable geometry Venturi device with integrated Cycloidal turbines specifically designed for hydroelectric generation.

Unit 10 comprises four major sections, the debris guard 15, the inlet section 11, the turbine section 14 within which a cycloidal turbine is housed, and the diffuser section 13.

Figure 1A:
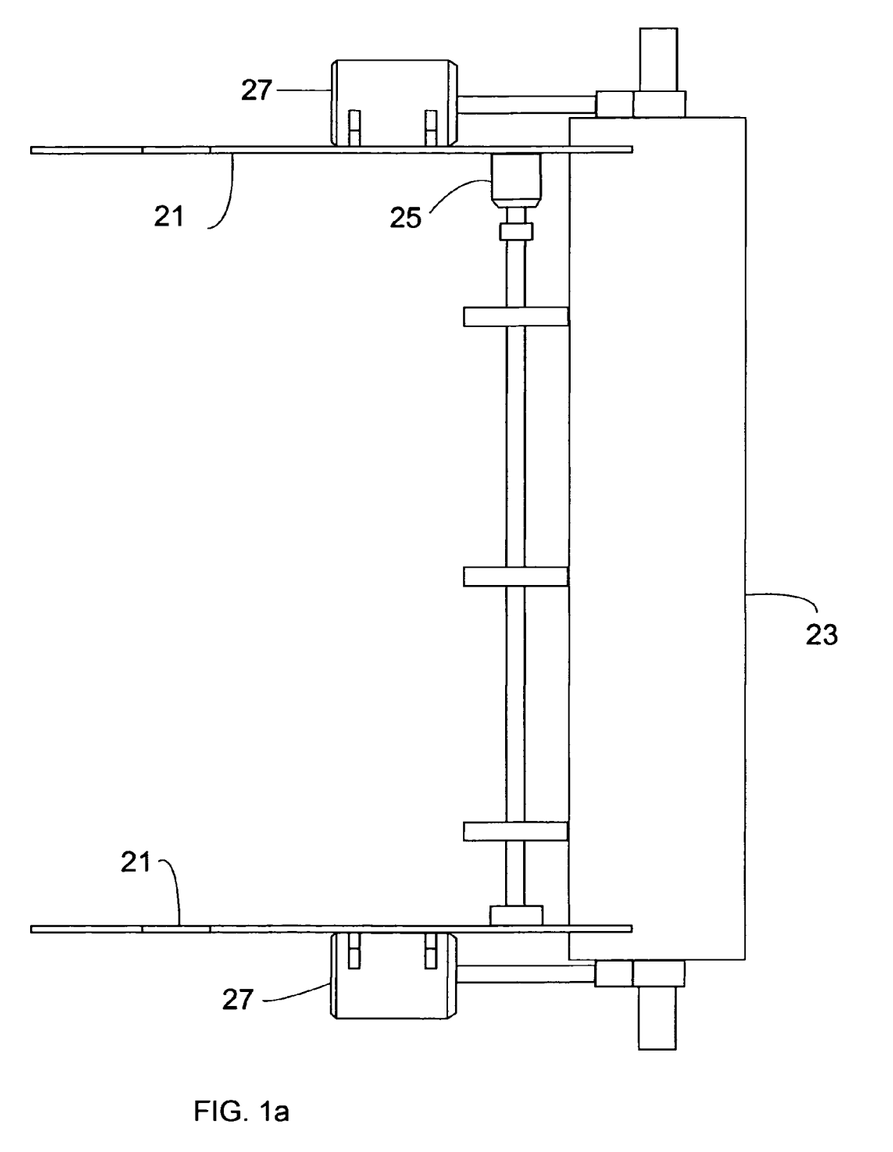
FIG. 1a is a view of construction details of a portion of the debris guard.

The debris guard 15 is installed to the front, or over the water intake (not shown) of the inlet section 11 and attached to the inlet section by any conventional mechanical means. The debris guard 15 may comprise a plurality of vanes 21 each configured as a "V", such as in the shape of an Isosceles Triangle, with the base of the triangle attached to the inlet section 11 and the point, or vertex, of the V pointed upstream and generally centered in the inlet section. The vanes 21 are typically installed horizontal to the water surface and parallel to each other, with sufficient space between the vanes for water to flow freely through the vanes. An angle of the vanes may be from about 30 degrees to about 45 degrees with respect to the vertex located in the center of the inlet. Multiple cylinders 23 are supported for rotation and rotatably driven by the force of water flow, as by small scoops or paddles on the culinders, or on wheels driving the cylinders, or, in some embodiments, by electric motors 25 (FIG. 1a). Rotational speed of the cylinders may be in the range of 5 RPM or less, and perhaps up to about 30 RPMs or so in order to avoid injury to fish and other aquatic creatures. The cylinders may be incorporated as shown into the debris guard 15 at each vertex of the triangle formed by vanes 21. For larger units, one or more cylinders 23 may be mounted between the center vertex and the ends of the debris guard. Angles of the front edges of the vanes of the debris guard are such that any debris too large to pass through the slots between vanes 21 slides down the angled edges, which as noted may be from about 30 degrees to about 45 degrees. Where such debris encounters a rotating cylinder, rotation of cylinders 23 moves the debris over the cylinder in the direction of rotation of the cylinder. As such, rotation of the center cylinder moves the debris to one side in the direction of rotation of the cylinder, and the end cylinders move the debris off the debris guard in their respective directions of rotation. Thus, the right hand cylinder 23 (FIG. 1) rotates counterclockwise when seen from above, and the left hand cylinder rotates clockwise when seen from above. Surfaces of the cylinders may be configured to grip any debris and move it over the cylinder and aside, as by providing the cylinders with a frictional surface, such as a coarse sandpaper-like surface, small spikes imbedded in the surface, or the like. In other embodiments, the cylinders may drive small belts (not shown) along edges of vanes 21 in order to urge debris off and away from the debris guard. In yet other embodiments, the vanes may be configured as wedges with a longer side nearest the bottom of the streambed or the like so that debris moves over a top of the power generator. If rotating cylinders are provided in this embodiment, they would be mounted horizontally across the front of the wedge-shaped vanes. In yet other embodiments, the rotating cylinders 23 may be attached to time sequenced linear actuators 27 (FIG. 1a) to periodically and momentarily position the rotating cylinders 23 forward and then rapidly retract them to their original position in order to dislodge any debris that has become entangled in the vanes and is not moved by the rotating cylinders or force of the water. This significantly reduces the requirement for manual debris guard cleaning, reducing the probability of flow disruption or turbine stoppage. Further, the debris guard reduces the potential for injury to fish, mammals and curious humans by keeping them out of the inlet.

Figure 1B:
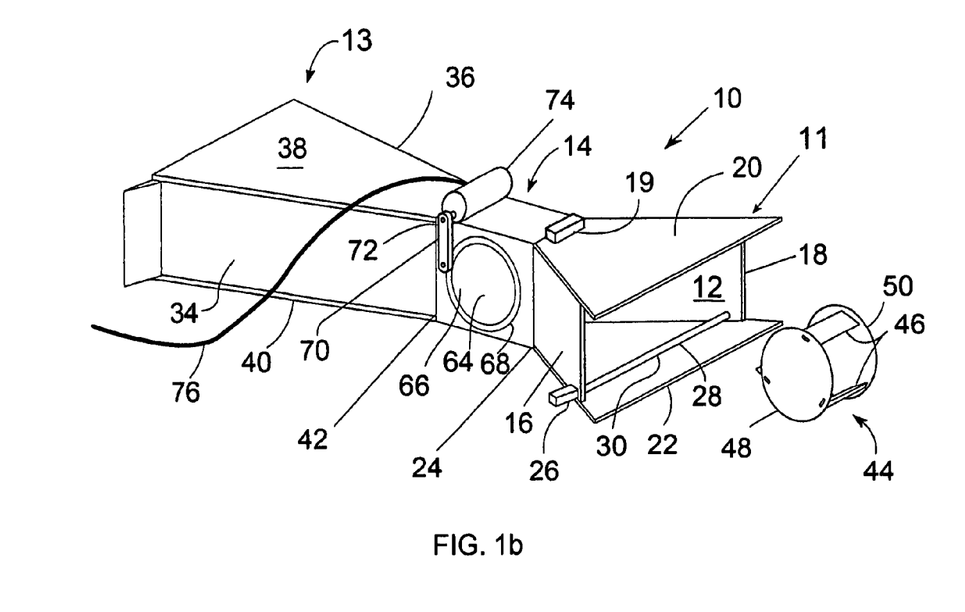
FIG. 1b is a view with the inlet removed to show construction details, and also showing construction details of the turbine.

Referring to FIG. 1b, Cycloidal Turbine power generation unit 10 is shown without the inlet vanes and rotating cylinders for clarity. Here, sides 16, 18 of inlet 12, when fully open, converges to the turbine in the manner of a venturi, and are angled at about 30 degrees. Length of inlet section 11 may vary, but typically is such that ambient flow velocity of a river or stream the power generator is in is doubled. Inlet side panels 16, 18 of inlet section 11 are free of attachment from top 20 and bottom 22 of the inlet section, with sides 16, 18 each being hingably attached by hinges 24 (only 1 shown) to turbine section 14. An inlet controller 26, which comprises a motor and position encoder, threadably engages each of sides 16, 18, as by a lead screw 28, that is provided with reversed threads at about a middle 30 thereof so that when the lead screw is rotated one direction, the sides 16, 18 are drawn together, and when rotated in the other direction the sides 16, 18 are forced apart. Thus, inlet section 11 may be widened or narrowed to regulate a flow rate of water passing through the turbine assembly 10, or closed completely, such as when water flow in the channel or stream becomes too rapid, or during a storm, flood or maintenance operations. As such, the inlet section 11 forms a variable Venturi such that when fully opened, the sides are at an angle of about 30 degrees, the sides being infinitely variable to a point where the inlet section 11 is fully closed. Significantly, during rapid water conditions when it becomes necessary to close the water inlet to prevent damage to the power generator, the closed sides 16, 18 across the inlet section form a streamlined V shape. This streamlined shape prevents the power generator from becoming dislodged or washed away completely. As noted, the diffuser section 13 is twice as long, and extends at half the maximum angle as the inlet section, or 15 degrees, in order to slow water exiting the turbine to ambient water flow.

Figure 2:
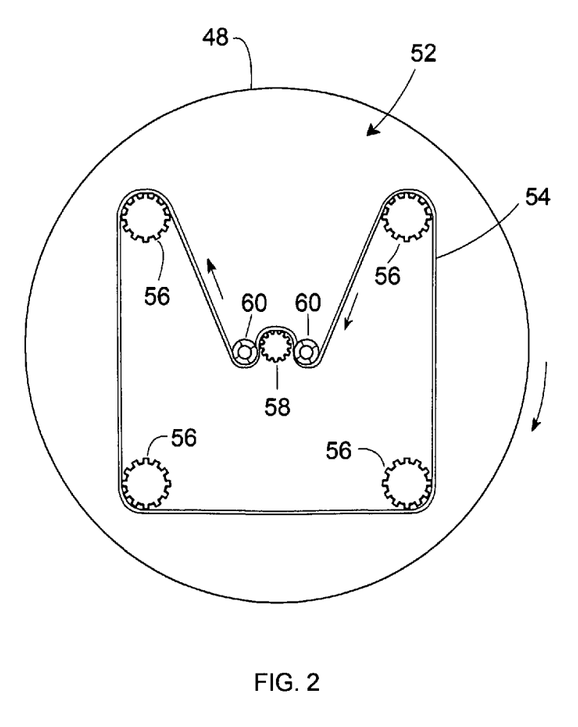
FIG. 2 is a diagram, by way of example only, of synchronous belts and pulleys that change pitch and angle of attack of the turbine blades.
Figure 3:
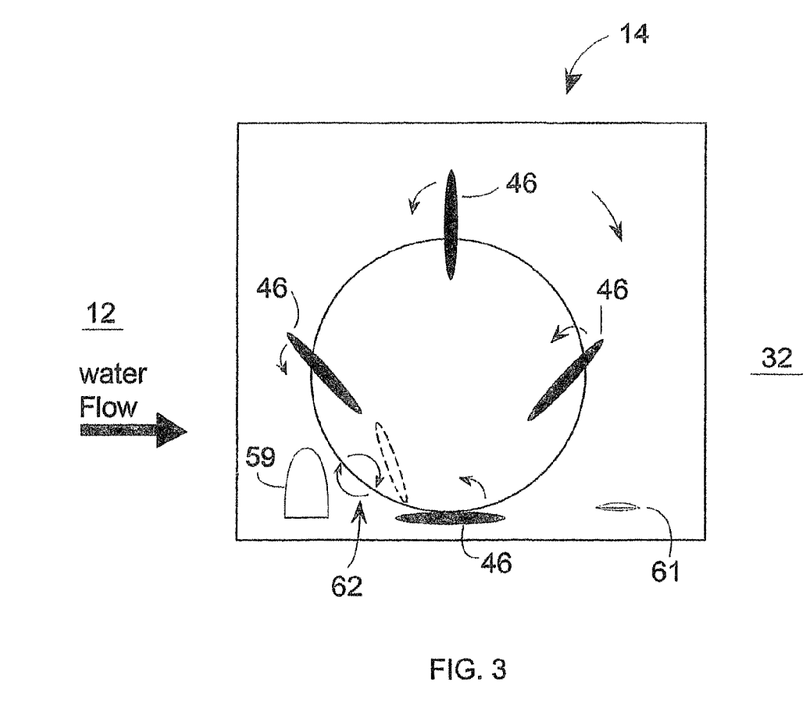
FIG. 3 is a diagram illustrating operation of the turbine.
Figure 4:
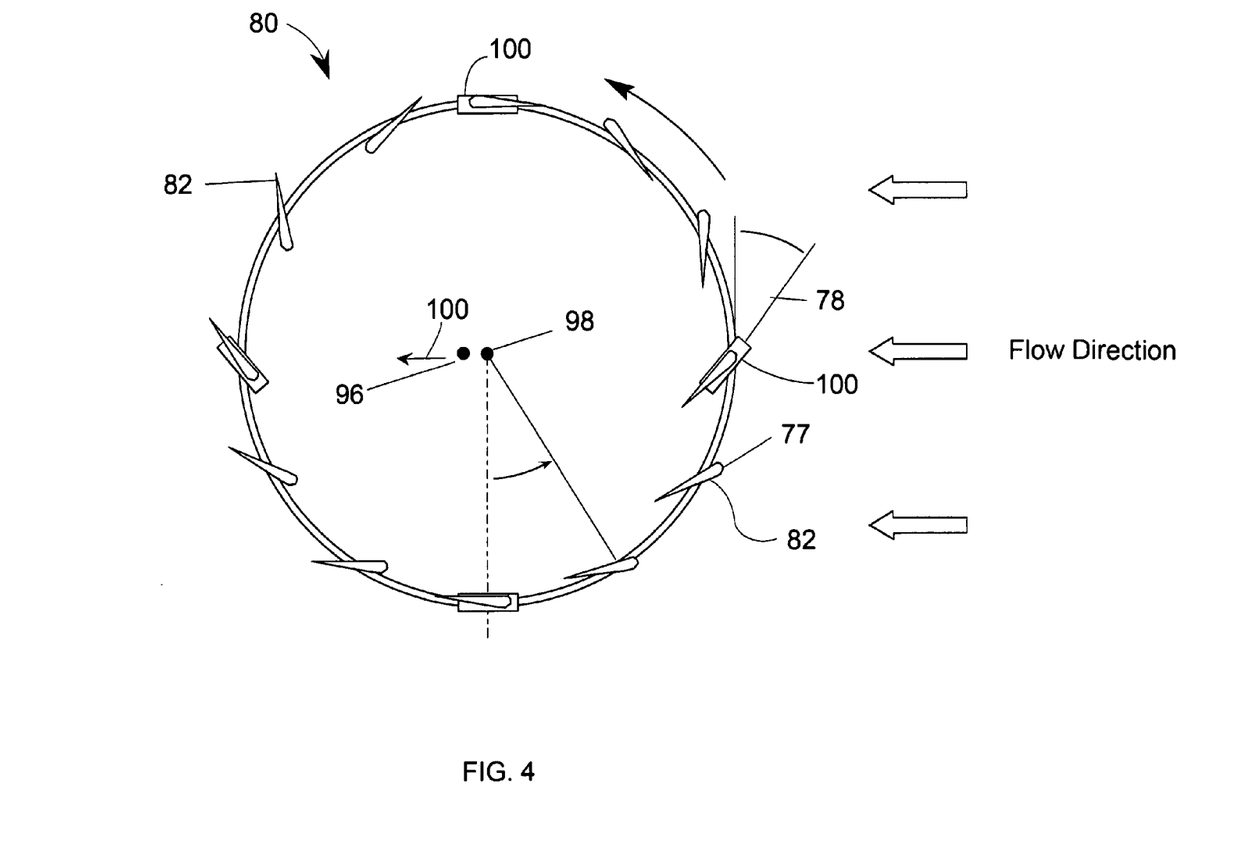
FIG. 4 illustrates another mechanism for changing pitch and angle of attack of the turbine blades.

The motor incorporated with controller 26 is of sufficient power to open and close side panels 16, 18, with the position encoder reporting the position of the inlet sides. A flow velocity measuring device 19, which may be a mechanical, pressure sensitive or ultrasonic device, may be mounted in inlet 12, typically near the turbine for measuring velocity of water flow at the turbine, although such device 19 may also be mounted along an external side of the turbine, or any other location where water flow, either through the turbine or external to the turbine, may be determined. Such a determination of flow velocity at the turbine is necessary in order to optimize turbine performance and prevent damage during periods of excessive water velocity. In some embodiments, the flow velocity measuring device 19 may be a remote device that provides a signal to the controller, and may be positioned in front of inlet 12. In this instance, flow velocity at the turbine may be extrapolated from position of the sides 16, 18, or taken from a lookup table. The flow velocity measuring device and side panel position encoder are coupled to a computer for processing at least the respective signals therefrom and develop signals for the lead screw motor in controller 26 to adjust position of the inlet sides in accordance with velocity of water flow through the turbine and to adjust the turbine itself. In embodiments using a turbulator, as will be further explained, degree of inflation of the turbulator may also be calculated and taken into account. In one embodiment for tidal applications, the turbine section 14, which is configured generally as a cube, is provided with a cross-flow turbine 44, the turbine having a plurality of identical, equally spaced blades 46, as shown in FIGS. 2, 3 and 4. Each blade 46 is mounted at respective ends thereof to a disk 48, 50 (FIG. 1b) so that the turbine resembles a cage-like structure.

The blades 46 are mounted for rotation to the disks 48, 50 using a variable pitch mechanism that varies the pitch of the blades as the disks rotate through 360 degrees of rotation. As shown in FIG. 2, this pitch change is implemented by a synchronous serpentine drive assembly 52 and corresponding synchronous pulleys 56 on ends of each of the blades, and a synchronous pulley 58 fixedly mounted to a non-rotating axle that supports the turbine. A synchronous serpentine belt 54 passes as shown along an outboard edge of each of pulleys 56. As such, pulleys 56 serve as blade angle controllers, one pulley per blade. The synchronous belt 54 is passed over a small synchronous pulley 58 mounted to a non-rotating center shaft about which the turbine is rotatably mounted, pulley 58 held stationary to provide a drive force to the synchronous belt 54 opposite to the direction of rotation of disk 48. A pair of idler pulleys 60 serve to maintain tension on the belt, and being located on opposite sides of pulley 58, distribute rotational force of the disk around about 180 degrees of the circumference of pulley 58. The ratio between pulley 56 and pulley 58 is such that for every 360 degrees rotation of disk 48, the blades each rotate 180 degrees. In other embodiments, gears, or a drive chain and sprockets, may be used to transfer power while maintaining blade timing.

The blades 46 rotate in the opposite direction the turbine is turning, so that if the turbine is turning in a clockwise direction, as shown in FIG. 2, the blades rotate in a counterclockwise direction, as shown in FIG. 3. Further, the blades are positioned, or "timed", as shown in FIG. 3 so that, with respect to water flow, a blade at the 12:00 position is normal to the flow of water, an upstream blade at the 3:00 position is at 45 degrees with respect to the flow of water, and the downstream blade at 9:00 is at 135 degrees with respect to the flow of water. The $4^{th}$ blade, at the 6:00 position, is parallel to the flow of water. Thus, beginning at the 6:00 blade, the lagging edge thereof, when the turbine is rotated clockwise to place the 6:00 blade at the 9:00 position, becomes the leading edge, which becomes the lower edge at the 12:00 position, and which becomes the lagging edge at the 3:00 position, and which becomes the leading edge at the 6:00 position. This particular blade motion is known as "Pi-pitch" motion.

Figure 5:
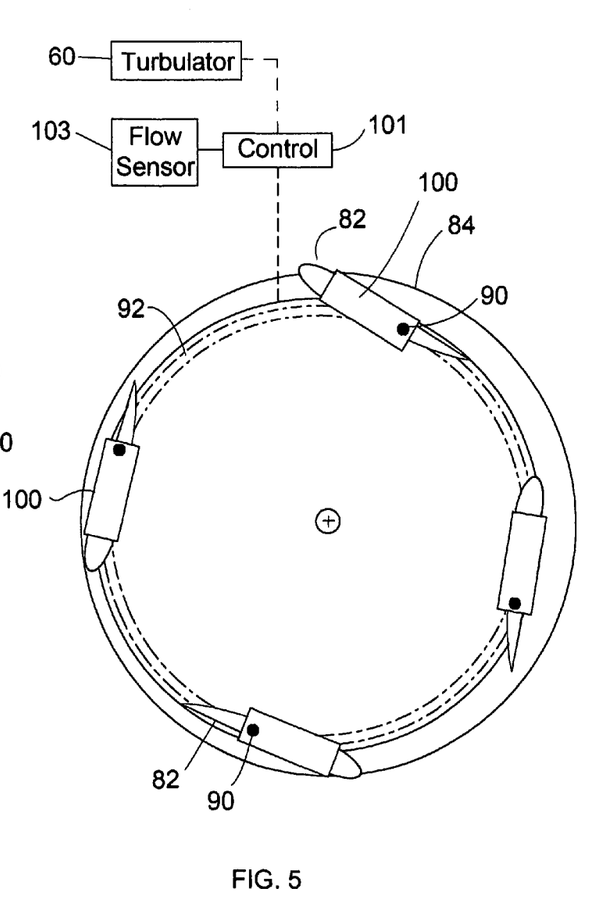
FIG. 5 illustrates operational details of the apparatus of FIG. 4.
Figure 5A:
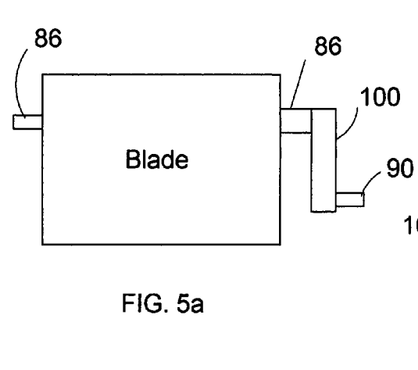
FIG. 5a illustrates construction details of the apparatus of FIG. 5.
Figure 6:
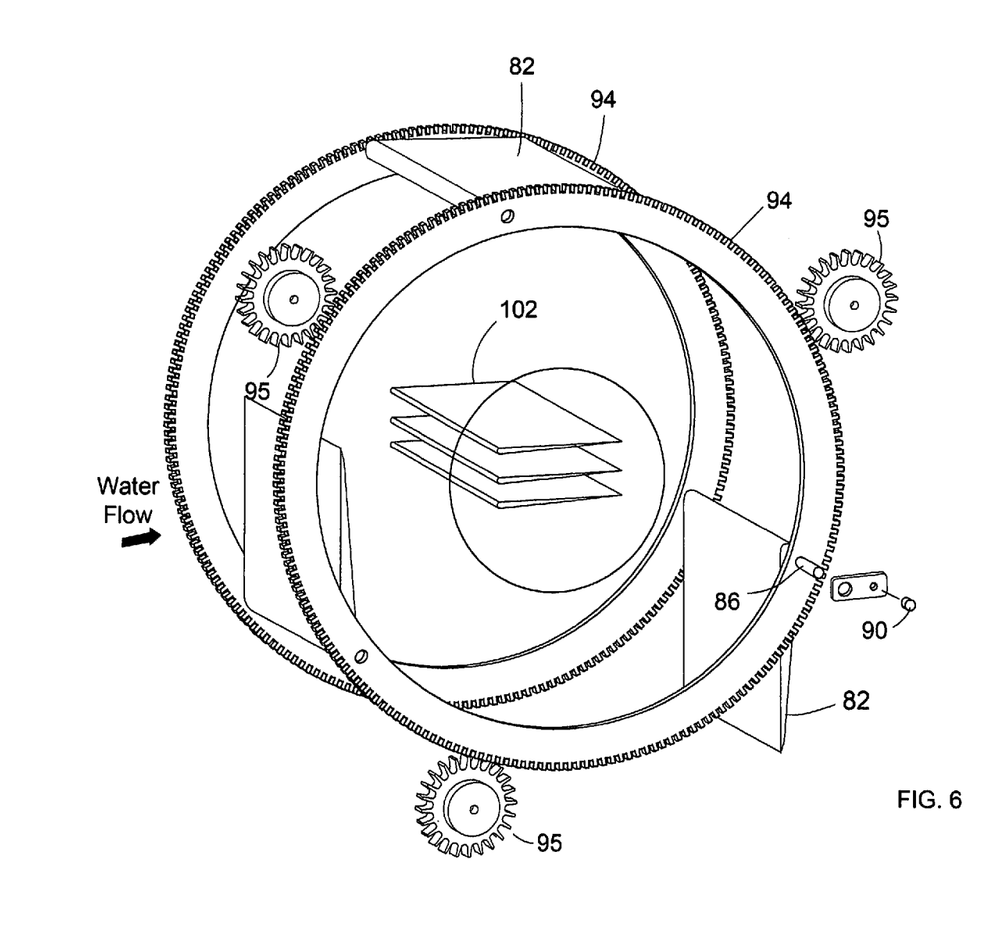
FIG. 6 illustrates another embodiment of the invention.

In another embodiment, and as shown in FIG. 4, a Curtate motion turbine 80 can be installed in the same structure that supports Pi-pitch blade motion turbine 44 (FIG. 1b). Curtate motion of blades 82 varies substantially from Pi-Pitch motion in that a leading edge 77, as illustrated by blade 82 at the 4:00 position, of each Curtate turbine blade makes excursions from a line tangent to the circumference of the rotor disk to achieve a positive or negative angle of attack, as shown at 78. This motion is achieved, as shown in FIG. 5, by mounting the turbine blades 82 (only 3 shown) in a cage-like structure comprising end members 84 (only 1 shown) similar to disks or plates 48, 50 of FIG. 1b, except each blade is mounted to end member 84 via a through-bearing for rotational movement at pivot points 86. The blade shaft then extends beyond end member 84 a sufficient length for mounting of cam follower arm 100 so that cam follower 90 rides in eccentric cam race 92 as end plate 84 rotates. It is noted that not all the blades in FIG. 4 are shown with a cam follower 100; however, it is to be understood that all the blades would have such a cam follower. With this construction, as end member 84 rotates, pitch of each of blades 82 is determined by location of a respective cam follower 90 in the eccentric cam race 92. In another embodiment, and as shown in FIG. 6, the blades may be mounted for rotational movement in rings 94, with cam followers 90 mounted on the extended blade shaft passing through each of rings 94 to engage an eccentric cam race 92 (FIG. 5). Significantly, the end member or ring with eccentric cam race 92 may itself be mounted for movement parallel to end member 84 (or rings 94) so that the degree of pitch of blades 82 may be adjusted by varying the direction and degree of eccentricity of eccentric cam race 92. Here, and referring back to FIG. 4, a center 96 of the eccentric cam race is behind (with respect to direction of water flow) a center of rotation 98 of the blades. By moving eccentric center 96 further away, in the direction of arrow 100, blade pitch excursions are increased, decreasing efficiency of the turbine and reducing loads thereon, such as when water is moving faster and may exceed design specifications of the turbine. On the other hand, when water is moving slower, eccentric center 96 may be moved closer to the center of rotation of blade axis 98, increasing efficiency of the turbine. As noted, with the eccentric cam race mounted in a movable plate or ring, control circuitry 101 (FIG. 5), which may include a water flow rate sensor 103 mounted near the turbine to sense a flow rate through the turbine as described above, and in some instances an encoder to sense position of side walls of the inlet, may be used to automatically adjust position of eccentric cam race 92 in accordance with the flow rate. In some embodiments, it may be useful to move the eccentric cam race upward or downward in conjunction with use of other devices to increase efficiency of the turbine.

As a particular feature of the invention, a partial barrier, or turbulator 59, which may take the form of a tubular, inflatable bladder (FIG. 3), or in other embodiments may be shaped as a ramp, vertical wall or the like, is installed near the bottom and across the width of the inlet of turbine section 14, or across a width at least as wide as blades 46 extend. The turbulator is equipped with an actuator, which may be a water pump, to inflate the turbulator and elevate it into a portion of the water flowing through the turbine. This turbulator 59 may extend upward as much as 45% of the height of the turbine. With turbulator 59 inflated, a flow reversal region 62, a vortex as shown in FIG. 3 as a circular flow 62 of water is created downstream from the turbulator for a distance determined by the velocity of the water flow and the shape and height of the inflated turbulator. During operation, flow velocity of the water is accelerated over the top of the turbulator, thereby increasing energy of the flow in the upper region of the turbine. As shown in dashed lines, when a blade 46 is rotated counterclockwise from the 6:00 position to the 9:00 position, it passes through at least a portion of the flow reversal region 62, which interacts with the respective blade 46 to reduce hydrodynamic drag on the blade and as it nears the inflated turbulator the reversed water flow applies pressure to blade 46 along vectors that assist the turbine in rotating. Thus, at positions of rotation of the blades, i.e. from 6:00 to 9:00, where hydrodynamic drag on the blade advancing into the flow would otherwise present an impediment to rotation of the turbine, the water flow is modified to reduce drag and facilitate rotation of the turbine. This increases efficiency of the turbine by both eliminating an impediment to rotation and effectively causing the blade or blades that otherwise would be impeded to work in cooperation with rotation of the turbine. By using one or more turbulators, such as turbulator 59 and a second turbulator along a top of the turbine housing and opposed from turbulator 59, an efficiency increase of up to 40% or so may be achieved.

The turbulator 59 may be automatically inflated to a variable optimum height, depending on flow velocity, by an electric water pump and associated valves activated by a computer and computer program that receives and processes signals from sensor 19 (FIG. 1b) measuring flow velocity in inlet 12, flow direction of the water through the turbine, i.e. where the turbine assembly is used in a tidal application, and turbulator internal pressure. As water flow velocity changes, such as during tidal changes or during upstream rainfall and other situations that cause a change in water velocity, the height of the turbulator is adjusted by the computer program to optimize turbine velocity in accordance with varying water flow conditions. In high water situations where flow velocity may exceed the structural limits of the turbine blades, the inflated turbulator is commanded by the computer program to deflate or retract the turbulator, thus slowing the velocity of the water over the turbine blades in the upper region of the turbine and increasing drag on advancing blades in the lower portion of the turbine. In the Pi-Pitch configuration, the chain or synchronous belt 54 (FIG. 2) and corresponding synchronous pulleys, sprockets or gears 56, 58 may be enclosed within a cylindrical watertight cover 64 (FIG. 1b) configured with bearings along an exterior side thereof, with corresponding bearing surfaces in a cylindrical opening 66 generally the size of cover 64 in turbine section 14. The center, non-rotating shaft (not shown) about which the turbine rotates and to which gear 58 (FIG. 2) is fixedly mounted may be attached to an opposite side of turbine section 14. With this construction, the turbine is mounted for rotation on one side by the cover 64 in opening 66 in turbine section 14, and mounted for rotation on the other side about the center shaft, which extends through the turbine to support gear 58. As described, a ring gear 68 (FIG. 1b) attached to cover 64 may be used to transmit power to a pinion gear 70, and a belt 72 may be used to transfer power from the pinion 70 to a generator 74. Ring gear 68, pinion 70, belt 72 and generator 74 would typically be enclosed by a watertight cover, or otherwise enclosed so that the generator is watertight. While a particular scheme is disclosed for developing electrical power, it should be apparent to those skilled in the art that other ways are readily available to rotate an electrical generator using the turbine of the present invention. For instance, the shaft or axle about which the turbine rotates could be fixed to the turbine and thus also rotate, and power a generator via a gear train or gearbox. Likewise, rather than using a belt or chain to power the generator, a gear train could be used. In any case, an electrical power cable 76 transfers electrical power from generator 74 to a site/sites where it is used or stored.

In some instances, it is contemplated that the power generator be placed in a channel of a tidal pool where rising and falling tides would cause a flow of water in alternating directions through the power generator. In this case, the water turbine would alternately be operated in opposite directions, with the generator configured to provide power for each direction. To accommodate this installation, one or more tubulators 61 (FIG. 3) corresponding to turbulator 59 is mounted in the same relative location in the outflow of turbine section 14 as turbulator 59 is mounted with respect to the inflow of turbine section 14. In this embodiment, with water flowing through turbine section 14 in alternating directions, the upstream turbulator would be inflated, and the downstream turbulator would be deflated corresponding to reversals of water flow through the turbine. Also with respect to this embodiment, the inlet and outlet could be configured similarly, and with sides that are fixed at 30 degrees.

As another feature of the invention, and referring to FIG. 6, Applicant has found that performance of the downstream blade or blades 82 is less than performance of the upstream blades. Tests have shown that this decreased performance is due to turbulence created by the upstream blades. Applicant proposes to smooth this flow between the upstream blades and downstream blades, making water flow through he turbine more laminar, by a smoothing mechanism. In one embodiment of such a smoothing mechanism, Applicant proposes to position a plurality, in this case three, flat flow straightener 102 across a center of the turbine as shown and generally parallel to the flow of water through the turbine. These plates 102 minimize turbulence by smoothing out the turbulence and creating a generally turbulence-free zone downstream of the upstream blades, allowing the downstream blades to perform better and increasing efficiency of the turbine. As noted above, ring gear 94 and associated gears 95 facilitate transmission of power to electrical generators. Such a ring gear and associated gears may be used in other embodiments to transfer power to a generator.

Figure 7:
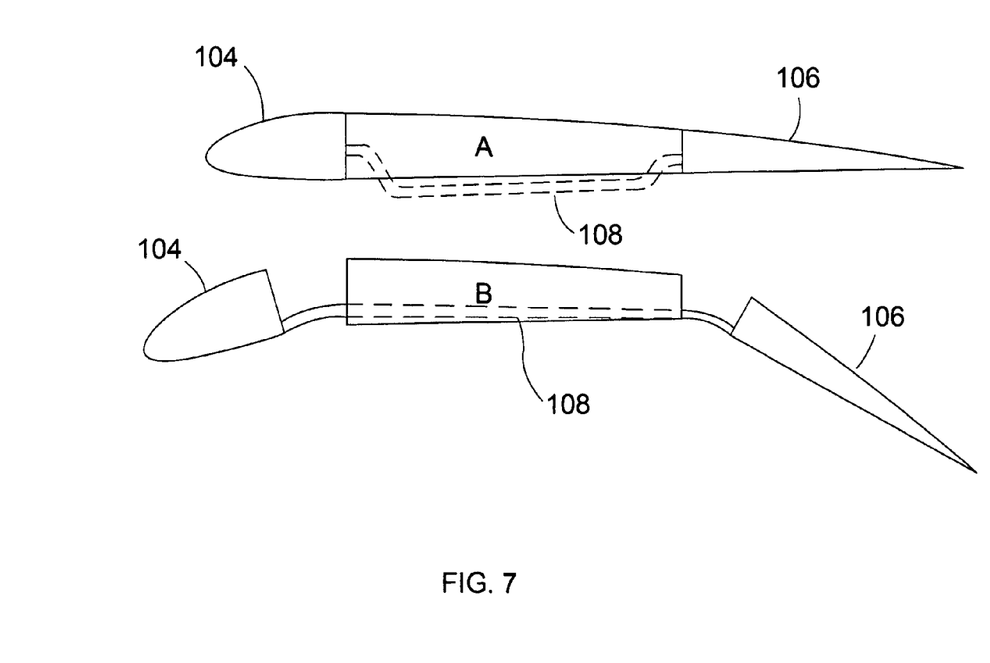
FIG. 7 illustrates details related to how shape of a turbine blade may be changed.

In yet another enhancement, and as shown in FIG. 7, Applicant proposes to increase performance of the downstream blades by an adjustment mechanism for modifying shape of the blades depending on whether they are upstream or downstream with respect to each other. In this instance, leading edges and lagging edges of each blade are provided with an extendable and retractable foil 104 for leading edges and an extendable and retractable foil 106 for lagging edges. These foils are extended as a blade or blades enter the region of turbulence downstream from the upstream blades, with the modified shape of the downstream blades increasing efficiency of the turbine. Here, leading foil 104 and lagging foil 106 may be connected together by a spring member 108, which is the adjustment mechanism, and fabricated from a memory alloy, i.e. a metal alloy used to fabricate parts that "remember" their original shape, for either deployment or retraction of leading edge member 104 and lagging edge member 106. Spring member 108 may be configured having a memory that pushes leading edges 104 and lagging edges 106 outward, as shown for blade B, or draw edges 104 and 106 inward, as shown for blade A. Deployment or retraction of the leading and lagging edges may be facilitated using solenoids or other actuators such as piezoelectric ceramics, shaped memory alloy or mechanical actuators. For instance, each blade may have a rod, bar or other member extending longitudinally at least partially therethrough, such member having a camming or levering surface thereon, and extending from the blade so that it may be moved or tripped by a stationary trigger or trigger portion positioned at a point of blade rotation where the blade begins to enter a region of turbulence, with a second trigger point where the blade exits the region of turbulence. A cammed or levered surface on each of movable edges 104, 106 may be provided, and which is engaged by the camming or levering surface of the interior member, thus moving edges 104, 106 to the positions shown for blade B when initially triggered, and allowing the memory alloy to return edges 104, 106 to their original position for blade A at the second trigger point. The first and second trigger points, actuators or the like may be positioned at about the rearward 120 degrees or so of rotation of the turbine, so that edges 104, 106 are extended as the respective blades rotate through the downstream 120 degree portion of rotation of the turbine.

Figure 8:
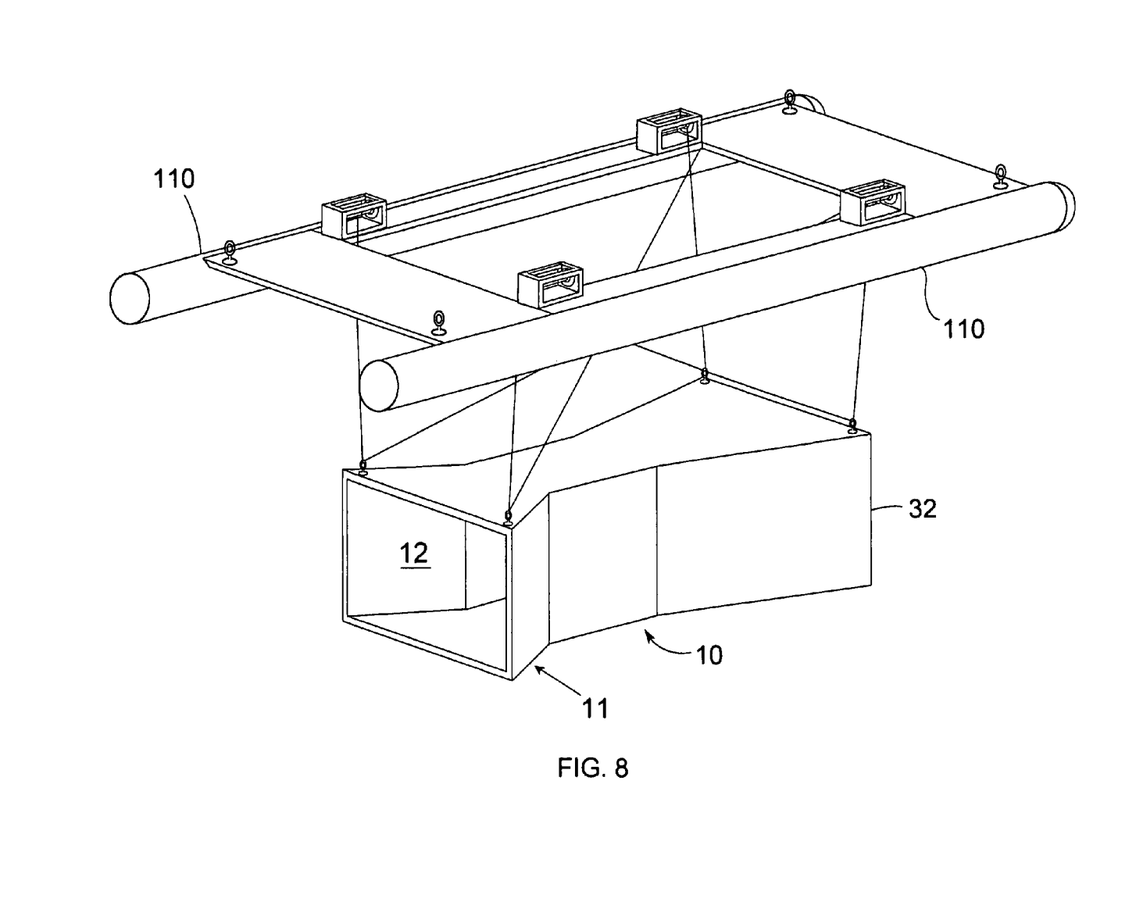
FIG. 8 shows how a turbine of the instant invention may be deployed.

In some embodiments, and referring to FIG. 8, flotation bags 110 (illustrated by way of example only) would be employed to place the generator 10 (shown without the debris guard) at its desired location. In this instance, the power generator would be floated to its desired location, and air gradually released from the flotation bags in order to carefully sink the power generator in place.

In operation, the generating apparatus is a compact hydroelectric generator. The apparatus is secured onto the floor of a body of flowing water or it may be suspended from a floating vessel, or an anchored floating assembly as shown in FIG. 8, so that water flows through the apparatus. Inlet section 11 and diffuser 13 are shaped similarly to a Venturi, which accelerates the ambient flow of water, thus increasing the kinetic energy of the water flow. The water flow drives the turbine, producing a rotational force that is linked by a ring and pinion gear or other mechanical transfer arrangement to one or more generators or alternators that convert the rotational energy into electricity. The electric energy created is transmitted by appropriate electric conducting cables from the generators/alternators to power conditioners on shore, and subsequently to facilities that use the power, power storage or to a power grid. The Venturi inlet side walls are hinged to the Turbine Section of the Venturi and are able to be moved inward from their maximum open position to a fully closed position. This feature allows the volume of water entering the turbine section to be controlled or blocked completely, and is useful in varying water flow conditions, during maintenance, or during relocation of the system. When operating, the turbine of the instant invention provides power generation to achieve a grid tie at industry standards.

Having thus described my invention and the manner of its use, it should be apparent to those skilled in the relevant arts that incidental changes may be made thereto that fairly fall within the scope of the following appended claims, wherein I claim:

1. An electrical power generating apparatus for generating electrical power from flowing water comprising:
   a water inlet configured as a variable geometry Venturi through which a flow of water enters said power generating apparatus,
   a water inlet controller for controlling size of said water inlet in accordance with velocity of flow of water through said power generating apparatus,
   a water outlet through which said flow of water exits said power generating apparatus,
   a turbine housing between said water inlet and said water outlet,
   a turbine supported for rotation within said turbine housing, said turbine comprising:
   a plurality of turbine blades,
   a variable pitch mechanism associated with said plurality of turbine blades so that pitch of each turbine blade of said plurality of turbine blades is varied as said turbine rotates,
   an electrical generator coupled to said turbine.

2. An electrical power generating apparatus as set forth in claim 1 wherein said water inlet comprises a debris guard further comprising:
   a plurality of spaced apart vanes across said water inlet, with front edges of said vanes configured at an angle selected to deflect debris around said inlet,
   at least one rotating cylinder across said inlet and perpendicular to said vanes, for moving debris either across or around said inlet.

3. An electrical power generating apparatus as set forth in claim 2 wherein said spaced apart vanes are horizontally oriented across said water inlet, with a vertex of said vanes at about a center of said water inlet, and edges of said vanes angled backwards from said vertex toward sides of said water inlet, so that debris is urged around said power generating apparatus.

4. An electrical power generating apparatus as set forth in claim 3 wherein a first said rotating cylinder extends vertically across said vertex of said vanes.

5. An electrical power generating apparatus as set forth in claim 4 further comprising second and third rotating cylinders vertically extending across said vanes at sides of said water inlet.

6. An electrical power generating apparatus as set forth in claim 5 further comprising actuators mounted to said first, second and third cylinders, for displacing a position of said first, second and third cylinders in order to dislodge debris therefrom.

7. An electrical power generating apparatus as set forth in claim 1 wherein said water inlet further comprises hinges between at least two of said inlet panels and said turbine housing so that said inlet is variable from a fully closed position to a fully open position.

8. An electrical power generating apparatus as set forth in claim 7 further comprising:
   at least one water flow sensor positioned to sense flow of water into said inlet,
   a lead screw between said at least two inlet panels,
   a motor connected to rotate said lead screw responsive to said water flow sensor, thereby moving said inlet panels and varying said size of said inlet in accordance with said flow of water into said inlet.

9. An electrical power generating apparatus as set forth in claim 8 wherein said inlet panels are opposed sides of said inlet.

10. An electrical power generating apparatus as set forth in claim 1 further comprising:
    at least one turbulator in said flow of water,
    a vortex generated in said flow of water by said turbulator, said vortex being generally the length of said turbine blades and generally parallel with said turbine blades, and located to interact with said turbine blades along the length of said turbine blades in a vortex region where each turbine blade of said turbine blades is moving toward said flow of water, creating additional rotational force on said turbine by said turbine blades in said vortex region, said additional force being in a direction said turbine is rotating.

11. An electrical power generating apparatus as set forth in claim 10 wherein said turbulator is an elongated, controllably inflatable bladder generally parallel to said turbine blades, and positioned just in front of said turbine blades moving toward said flow of water.

12. An electrical power generating apparatus as set forth in claim 10 wherein said water outlet is configured as a second variable geometry Venturi with a respective second water inlet controller, allowing said power generating apparatus to be used in a tidal environment.

13. An electrical power generating apparatus as set forth in claim 12 further comprising:
    a second turbulator in said flow of water,
    a second vortex generated in said flow of water by said turbulator, said second vortex being generally the length of said turbine blades and generally parallel with said turbine blades, and located to interact with said turbine blades along the length of said turbine blades in a second vortex region where each turbine blade of said turbine blades is moving toward said flow of water entering said water outlet, creating additional rotational force on said turbine by said turbine blades in said second vortex region, said additional rotational force being in a direction of rotation of said turbine.

14. An electrical power generating apparatus as set forth in claim 13 wherein said turbulator is an elongated, controllably inflatable bladder generally parallel to said turbine blades, and positioned just in front of said turbine blades moving toward said flow of water.

15. An electrical power generating apparatus as set forth in claim 1 further comprising at least one water flow straightener mounted within said turbine, said water flow straightener extending generally the length of said turbine blades, for reducing or eliminating turbulence caused by upstream said turbine blades.

16. An electrical power generating apparatus as set forth in claim 15 further comprising a plurality of water flow straighteners mounted within said turbine.

17. An apparatus as set forth in claim 1 wherein said variable pitch mechanism develops a Pi-pitch motion.

18. An apparatus as set forth in claim 1 wherein said variable pitch mechanism develops a Curtate motion.

19. An apparatus as set forth in claim 18 further comprising an adjustment mechanism for adjusting extent of pitch of said turbine blades.

20. An apparatus as set forth in claim 1 further comprising a blade shape adjustment mechanism in each turbine blade of said turbine blades, for adjusting shape of each said blade depending on whether a said blade is in an upstream position or a downstream position.

* * * * *